United States Patent [19]

Graule et al.

[11] Patent Number: 5,667,548
[45] Date of Patent: Sep. 16, 1997

[54] PROCESS FOR PRODUCING CERAMIC GREEN COMPACTS BY DOUBLE LAYER COMPRESSION

[75] Inventors: Thomas Graule, Holzbrunnenstrasse 24; Ludwig J. Gauckler, Gemsgasse 11, both of CH-8200 Schaffhausen; Felix Baader, Zurich, all of Switzerland

[73] Assignees: Thomas Graule; Ludwig J. Gauckler, both of Schaffhausen, Switzerland

[21] Appl. No.: 351,370

[22] PCT Filed: Apr. 7, 1994

[86] PCT No.: PCT/CH94/00070

§ 371 Date: Feb. 3, 1995

§ 102(e) Date: Feb. 3, 1995

[87] PCT Pub. No.: WO94/24064

PCT Pub. Date: Oct. 27, 1994

[30] Foreign Application Priority Data

Apr. 8, 1993 [CH] Switzerland ............... 1096/93

[51] Int. Cl.⁶ .................................................. C03B 40/02
[52] U.S. Cl. ............... 264/86; 264/86; 264/299; 264/650; 501/88; 501/90; 501/97; 65/24

[58] Field of Search ................ 65/24; 264/56, 264/63, 86, 299; 501/88, 90, 97

[56] References Cited

U.S. PATENT DOCUMENTS

| 2,527,390 | 10/1950 | Blaha | 264/63 |
| 2,979,401 | 4/1961 | Szymaszek | 264/63 |
| 3,216,841 | 11/1965 | Thellmann | 264/86 |
| 4,624,808 | 11/1986 | Lange | 264/56 |

*Primary Examiner*—Donald E. Czaja
*Assistant Examiner*—Michael P. Colaianni
*Attorney, Agent, or Firm*—Bachman & LaPointe, P.C.

[57] ABSTRACT

The invention concerns the field of slip casting for producing green compacts. The disadvantage of state-of-the art slip casting is among others the need for removing the water through porous molds, the resulting shrinkage and the tendency of the green compact to form shrinkage cracks. These disadvantages are eliminated by internally coagulating by compression the double layer of solid slip particles, so that the green compact may be solidified without the need for removing the water.

14 Claims, No Drawings

PROCESS FOR PRODUCING CERAMIC GREEN COMPACTS BY DOUBLE LAYER COMPRESSION

The invention concerns a process for producing ceramic green bodies, as set forth below.

Essentially five shaping processes are known for the production of green bodies, more specifically pressing, isostatic pressing, extrusion, slip casting and injection molding. The choice of a shaping process depends on the configuration, function and number of items of the desired green body. The pressing and isostatic pressing processes use starting powder materials which are capable of flow and which can be easily pressed. Extrusion which is preferably suitable for axially symmetrical components makes use of a mixture of powders and organic or inorganic plasticizers. The injection molding process which is known from plastic technology is used for green bodies of a highly complex shape. In that process a ceramic powder/thermoplastic mixture is injected into a mold and then after the shaping operation the thermoplastic material or materials are driven out of the green body. In the slip casting procedure ceramic powder with water is processed with the addition of tensides and binders to produce a slip which is capable of flow, and then poured into porous molds. Removal of the water in the porous molds, for example comprising gypsum or porous plastic materials, results in green bodies which, after being removed from the mold, are dried and then sintered.

Slip casting has long been used and is preferably employed for the production of larger hollow green bodies. In spite of its wide spread and use, slip casting suffers from a number of disadvantages.

The hardening mechanism depends on the removal of water; consequently soluble constituents have a tendency to migrate, with the result of irregular distribution in the shaped green body.

The shaping process is slow, and density gradients may also occur in the green body. In addition, a green body which is produced in accordance with the known slip casting process is sensitive to mechanical effects and thus is only suitable to a limited degree for working in the green condition. The porous molds also have to be dried very carefully end at considerable cost, before they are ever put to use again. The molds impose limits in terms of the geometrical configuration of green bodies, in that for example undercut configurations are only possible to a limited degree.

Taking the known slip casting procedure and the disadvantages from which it suffers as their basic starting point, the inventors set themselves the object of further developing the slip casting process in such a way that the known disadvantages are eliminated. In accordance with the invention the object is attained by the process of the present invention which includes adding an active substance to a slip for decomposing the slip and forming ions for gradually altering the condition of the slip over time until the slip has solidified.

The process according to the invention provides a technically simple alternative to the known shaping processes, which is quick and thus inexpensive to carry into effect. In particular, in regard to the known slip casting procedure, improvements are achieved insofar as it is possible to shape green bodies which are of a geometrically more demanding configuration than hitherto, which satisfy all requirements to be made in respect thereof, in regard to their structure, surface properties end mechanical characteristics. As the hardening mechanism in the case of the slip casting process according to the invention is no longer primarily dependent on the removal of water, migration end unequal distribution of soluble constituents is extensively suppressed. The shaping process which takes place in accordance with the invention is significantly faster than the known processes, and the development of density gradients can also be avoided. In contrast to the green bodies produced in accordance with the state of the slip casting art, green bodies produced in accordance with the process of the present invention, with a suitable slip composition, are suitable for processing in the green condition, for example for mechanical dressing by drilling, boring, milling or grinding. The use of porous molds can be eliminated, in accordance with the invention they are replaced by molds of non-porous materials (metals, plastic materials ), thus avoiding the expensive drying operation prior to any re-use.

To attain the object specified in accordance with the invention, the basic starting point taken by the invention is that oxidic powder particles or powder particles which are coated with an oxide layer but which are otherwise non-oxidic are involved in water with different surface reactions, the nature or the type of which depends on the pH-value (potential-determining ions: H+and OH−) of the water. The result is charging of the powder particles, which is positive for the acid range and negative for the basic range.

Electrostatic charging of the powder particles and the potential characteristic at the particle surface/water interface in the acid and in the basic range determine the viscosity of a slip. The higher the absolute value of the surface potential, the lower is the viscosity and the better is the pourability of the slip. Minimum viscosity is also guaranteed if as few ions as possible, with the lowest possible level of charge, occur in the solution (lowest possible conductivity or low ion strength), as they produce a more rapid drop in the electrostatic potential when moving away from the particle surface.

To solidify a slip which is prepared in accordance with the invention, the invention described herein provides for a reduction in the repulsion forces between powder particles by compression of the double layer disposed in the vicinity of the particle surfaces. The term double layer is used to mean an ion layer which surrounds a particle (oxidic, non-oxidic with oxidic enclosure) and which comprises electrically charged co-ions and counterions. The thickness thereof is determined by the level of the surface potential of a particle and the concentration of the co- and counterions surrounding the particle. The term compression is also used to mean the reduction in the double layer thickness. That compression is effected for example by way of an increase in the concentration of ionic compounds (salts) in the slip. The repulsion forces between the powder particles greatly decrease as a result.

With an increasing amount of ionic compounds in the slip, the superimposition of attraction and repulsion forces results in total attraction of the particles and thus solidification of the slip system.

The repulsion forces can be reduced in accordance with the invention by the separate addition—that is to say admixing—of compounds containing molecules, e.g. urea, example 1, or insoluble salts, e.g., magnesium hydroxide, example 6, into the slip system from the outside, during or after pouring thereof into a mold. That operating procedure can result in solidification of the colloidal system within a short period of time and would therefore be suitable to provide for a shaping effect for components of a complicated shape, if a shaping procedure can be brought to an end within a short period of time. In order to continue, that is to say extend the solidification period, it is proposed in accordance with the invention that there is added to the slip, in the production thereof and prior to casting thereof, an active substance or an active substance combination which decomposes and in so doing forms ions which gradually alters the condition of the slip (also by compression of the double layer thickness), over time, until it has solidified. The active substances or active substance combinations—also referred to as substrates—which are preferably used are those which decompose in the slip itself, in which case the decomposition products produced increase the conductivity or the ion strength of the slip to such a degree that the slip solidifies, possibly also with the added effect of a catalyst, that is to say it internally coagulates. A reduction in the repulsion forces by the addition of charged ions or the formation thereof as a decomposition product can be effected in accordance with the invention both in the acid and in the neutral or basic pH-range of the slip. A shift in the pH-value, which promotes solidification, in the direction of the isoelectric point, is not required in that respect but is in principle also possible in accordance with the invention and can be used to enhance coagulation.

In accordance with the invention, active substances primarily considered are active substances in the form of organic molecules.

Compounds containing organic molecules in the form of urea, carboxylic acid esters, for example acetic acid esters, acid amides, decomposable carbohydrates, glycerine esters, phosphoric acid esters, sulfuric acid esters and derivatives thereof have proven themselves to be desirable in this respect.

It is also possible however to envisage using inorganic cations or anions (for example Ca or Mg) which are formed by slow dissolution of compounds which are difficult to dissolve (for example Ca(OH)2 or Mg(OH)2), with a simultaneous change in the pH-value.

If a mixture comprising an enzyme and an inorganic and/or organic substrate of the above-mentioned kind is to be added to a slip, then preferred enzymes are hydrolases (for example urease, carboxylesterase, acetylesterase), lipases, phosphorases, sulfatases and oxidases (for example glucose oxidase or catechol oxidase), in accordance with the invention.

In this embodiment of the process according to the invention the enzymes are intended to convert the active substances, depending on their nature, into anions or cations and possibly a residual molecule.

If self-decomposition of the active substances in the slip is desired, that is to say without the help of enzymes as decomposing agents, then active substances such as for example glycerine triester, glycerine diester, for example glycerine diacetate or gluconic acid lactone, have proven to be particularly desirable for that purpose.

The invention is described in greater detail hereinafter by means of the examples:

EXAMPLE 1

A basic casting slip was produced by the addition of 1180 g of aluminum oxide powder (CL 370 C; Alcoa, Federal Republic of Germany) to a solution of 1.76 g of tiron and 3.54 g of urea in 109 g of deionized water. After intensive high-speed dispersion the thin slip had a pH-value of 8–9. The slip which was then degassed under vacuum typically had at that time a viscosity of 500–1000 mPas. 3000–4000 units of urease (EC 3.5.1.5 ) in the form of an aqueous solution with 2000 units/ml of urease were added to the above-described prepared slip in order to increase the salt content in the suspension and thus also to reduce the stability of the slip. After homogenization of the slip which is now ready for casting, casting was effected in molds of plastic material or metal. Depending on the respective reaction conditions involved, the slip solidified after 15–60 minutes. Additional drying increased the strength of the green bodies produced. Removal from the mold was effected either directly after solidification was concluded, in the moist condition, or after a few hours of pre-drying in a condition in which the molded bodies have begun to dry. The dried green bodies are characterized by high levels of green density of up to 75% by volume and good sintering characteristics.

Alternatively the addition of enzyme (10,000–20,000 units of urease) can also be effected at the same time as the casting operation (for example in an injecting molding unit). Solidification of the slip then already occurs within a few minutes.

EXAMPLE 2

A basic casting slip with a pH-value of 10–10.5 was produced by the addition of 315 g of silicon carbide powder (FCP 10 NLC; Norton, Norway), 4.7 g of graphite (KS 6, Lonza) and 1.6 g of boron (Starck) to a solution of 1.5 g of urea as an acid amide and 0.3 g of KOH in 50.8 g of deionized water. After deagglomeration and degassing the prepared slip typically had a viscosity of 100–200 mPas. 1000–1500 units of urease (EC 3.5.1.5) in the form of an aqueous solution with 2000 units/ml of urease were added to that slip which was ready for casting. After casting in molds of metal or plastics material, solidification was effected by increasing the salt content and thus the ion concentration in the slip within a period of 15–30 minutes. The dried green bodies have green densities of 66–68%.

EXAMPLE 3

A basic casting slip with a pH-value of 11 was produced by the addition of 342 g of silicon carbide powder (FCP 07 NC; Norton, Norway) to a solution of 1.59 of butylamine in 50 g of deionized water. After deagglomeration and degassing the prepared slip typically had a viscosity of 1000–1500 mPas. 1.9 g of triacetin was added to that slip which was ready for casting. After casting in molds of metal or plastic material, solidification was effected by virtue of self-hydrolysis of the triacetin and the resulting increase in the salt concentration as well as the change in the pH-value to about pH 8 within 10–20 minutes. Accelerated solidification can be achieved by the addition of lipase (EC 3.1.1.3). The dried green bodies achieve green densities of 67–68%.

EXAMPLE 4

A basic casting slip with a pH-value of 11–12 was produced by the addition of 900 g of silicon nitride (LC 10N, Starck Co, Federal Republic of Germany) to a solution of 5.0 g of isopentylamine in 200 ml of deionized water. After the addition of 10.0 g of triacetin the degassed slip had a viscosity of 500–1000 mPas. After casting molds of metal or plastic material solidification was effected by virtue of self-hydrolysis of the triacetin within a period of 15–30 minutes. The dried green bodies achieve green densities of 57–58%.

EXAMPLE 5

A basic casting slip with a pH-value of 8.5–9 was produced by the addition of 200 g of silicon carbide (FCP 07 NC, Norton, Norway) to a solution of 1.0 g of acetic acid ethyl ester and 0.5 g of triethanolamine in 33 ml of deionized water. The degassed slip had a viscosity of 100–200 mPas. After the addition of 500 units of carboxyl esterase (EC 3.1.1.1) and casting in molds of metal or plastic material solidification was effected by a simultaneous increase in the salt concentration and a change in the pH-value in the direction of the isoelectric point in 30–60 minutes. The dried green bodies are distinguished by green densities of 65–67%.

EXAMPLE 6

A basic casting slip with a pH-value of 9–10 was produced by the addition of 300 g of silicon carbide (FCP 10 NLC, Norton, Norway) to a solution of 1.5 g of acetic acid ethyl ester and 0.4 g of isobutylamine as well as 0.15 g of magnesium hydroxide in 33 ml of water. The degassed slip typically had a viscosity of 1000–1500 mPas. After the addition of 1000 units of carboxylesterase (EC 3.1.1.1) and casting in molds of metal or plastic material solidification was effected primarily by dissolution, which occurs with the pH-change from 10 to 7–8, of magnesium hydroxide and the accompanying formation of $Mg2+$-ions. Solidification occurred after 30–60 minutes. The dried green bodies have green densities of 65–67%.

EXAMPLE 7

An acid casting slip was produced by the addition of 400 g of aluminium oxide powder (HPA 0.5 with 0.05% by weight of MgO; Ceralox Corporation, USA) to a solution of 1.05 g of concentrated hydrochloric acid and 0.05 g of diphenylphosphate in 72.7 g of deionized water. The slip which was deagglomerated by ultrasonic treatment, at a pH-value of 4–5, had a viscosity of 100–300 mPas. In order to internally produce highly charged phosphate anions, 100 units of 3-phytase (EC 3.1.3.8) or 100 units of phosphodiesterase (EC 3.1.4.1 ) in the form of an aqueous solution were added to the above-prepared slip. After homogenization of the slip when ready for casting, casting was effected in molds of metal or plastic material. The slip solidified in between 30 minutes and 3 hours, depending on the respective reaction conditions involved. The dried green bodies have green densities of 58–62%.

EXAMPLE 8

An acid casting slip was produced by the addition of 440 g of aluminium oxide powder (HPA 0.5 with 0.05% by weight of MgO; Ceralox Corporation; USA) to a solution of 1.1 g of concentrated hydrochloric acid and 0.2 g of phenol sulfate in 80.0 g of deionized water. The prepared slip, at a pH-value of 4–5, had a viscosity of 100–300 Mpas.

For the purposes of internally producing highly charged sulfate anions, 200 units of arylsulfatase (EC 3.1.6.1) (a type of sulfatase) in the form of an aqueous solution were added to that slip. After homogenization of the slip and after casting in molds of metal or plastic material solidification occurred in 1–3 hours. The dried green bodies had green densities of 58–62%.

The Examples are directed to A1203, SiC and Si3N4 as ceramic materials. The invention however is not restricted thereto. It can also be applied to all other kinds of ceramics such as ZrO2 (TZP, PSZ, FSZ), SiC, Si3N4, BaTiO3, TiO2, mullite, MgO, kaolin, B4C, TiB2, BN, SiO2, and also so-called composites such as for example fiber-reinforced ceramics such as A1203/SiC, SiC/C or particle-reinforced ceramics such as A1203/ZrO2 (ZTA) and A1203/TiB2.

The invention is also not restricted to the solidification of slips which are cast in molds, but it can also be applied to freely shaped articles, thus for example spray granules which are produced by nozzle atomization of a slip. It can also be applied to articles which are cast flat on a flat surface without using a mold. Foils which are used in calcined form such as for example ceramic carriers of semiconductor components or thin and thick layers as are used as abrasion-resistant layers on glasses and other substrates can also be produced.

We claim:

1. A process for the production of ceramic green bodies, comprising the steps of:

providing a viscous slip comprising at least one of oxidic ceramic charged powder particles and non-oxidic ceramic charged powder particles, said non-oxidic particles coated with an oxide layer; and adding an active substance to the slip for decomposing the slip and forming ions for gradually altering the condition of the slip over time until the slip has solidified.

2. The process according to claim 1, wherein the active substance is in the form of organic compounds.

3. The process according to claim 2, wherein said compounds are selected from the group consisting of urea, carboxylic acid esters, acid amides, decomposable carbohydrates, phosphoric acid esters, sulfuric acid esters, and derivatives thereof.

4. The process according to claim 2, wherein said carboxylic acid esters are esters of acetic acid.

5. The process according to claim 3, further comprising the step of adding a decomposition aid which comprises a catalytically active enzyme combined with the active substance.

6. The process according to claim 5, further comprising the step of mixing an enzyme with the active substance.

7. The process according to claim 6, wherein the enzyme is selected from the group consisting of hydrolases, lipases, phosphorases, sulfatases and oxidases.

8. The process according to claim 7, wherein said hydrolases is selected from the group consisting of urease, amidase, carboxyl esterase and acetyl esterase and wherein said oxidases is glucose oxidase.

9. The process according to claim 1, wherein said step of adding comprises adding compounds to the slip having inorganic cations or anions.

10. The process according to claim 9, wherein said compounds including the inorganic cations are selected from the group consisting of calcium and magnesium, said slip having a basic pH range in which the compounds are difficult to dissolve, wherein dissolution of the cations is effected by means of the addition of the active substances which change pH values in the acid direction.

11. The process according to claim 10, further comprising the step of adding at least one of glycerine triester and glycerine diester to the slip as self decomposing active substances.

12. The process according to claim 11, wherein the glycerine triester is glycerine diacetate and the glycerine diester is gluconic acid lactone.

13. The process according to claim 1, including performing said step of adding prior to coagulation of said slip.

14. The process according to claim 1, wherein said step of altering the condition is delayed until said slip is added to a mold.

* * * * *